United States Patent
Liu et al.

(10) Patent No.: US 12,457,010 B2
(45) Date of Patent: Oct. 28, 2025

(54) ENERGY MANAGEMENT SYSTEMS

(71) Applicant: Enphase Energy, Inc., Petaluma, CA (US)

(72) Inventors: Fenghua Liu, Portland, OR (US); Jacob Marlon Rasco, Campbell, CA (US); Brenndon Lee, San Diego, CA (US)

(73) Assignee: Enphase Energy, Inc., Petaluma, CA (US)

( * ) Notice: Subject to any disclaimer, the term of this patent is extended or adjusted under 35 U.S.C. 154(b) by 23 days.

(21) Appl. No.: 18/409,422

(22) Filed: Jan. 10, 2024

(65) Prior Publication Data
US 2024/0243775 A1    Jul. 18, 2024

Related U.S. Application Data

(60) Provisional application No. 63/439,427, filed on Jan. 17, 2023.

(51) Int. Cl.
*H04B 3/54* (2006.01)
*H02J 13/00* (2006.01)

(52) U.S. Cl.
CPC ........ *H04B 3/542* (2013.01); *H02J 13/00007* (2020.01)

(58) Field of Classification Search
CPC ................. H04B 3/542; H02J 13/00007
USPC ............................................. 375/257
See application file for complete search history.

(56) References Cited

U.S. PATENT DOCUMENTS

2014/0192912 A1* 7/2014 Chappel ............... G06F 1/3206
375/260
2016/0330116 A1* 11/2016 Pande .................... H04L 45/70

* cited by examiner

*Primary Examiner* — Kevin M Burd
(74) *Attorney, Agent, or Firm* — Moser Taboada

(57) ABSTRACT

The present disclosure provides methods and apparatus for use with energy management systems. For example, an energy management system comprises a gateway and distributed energy resources coupled to a corresponding plurality of power conditioners and a distributed energy resource controller in operative communication with the plurality of power conditioners via power line communication, wherein the distributed energy resource controller is configured to generate a unique preamble for each power conditioner of the plurality of power conditioners and transmit the unique preamble to each power conditioner of the plurality of power conditioners to communicate with each power conditioner of the plurality of power conditioners via power line communication.

12 Claims, 5 Drawing Sheets

ENERGY MANAGEMENT SYSTEMS

CROSS-REFERENCE TO RELATED APPLICATIONS

The present application claims the benefit of and priority to U.S. Provisional Application Ser. No. 63/439,427, filed on Jan. 17, 2023, the entire contents of which is incorporated herein by reference.

BACKGROUND

Field of the Disclosure

Embodiments of the present disclosure relate generally to energy management systems, and, for example, to energy management systems that use power line communication (PLC) for domain and cross talk separations via unique preambles.

Description of the Related Art

Conventional energy management systems can comprise a gateway and power control units (PCUs), which may communicate via power line communication (PLC) to exchange information in a packetized form of digital signal. Each packet can comprise a preamble, a header, and a payload. The preamble (e.g., a random sequence) marks the beginning of the packet. There are two problems, however, if networks share/have the same preamble for a PLC communication in detecting an incoming PLC frame. First, any device configured to receive the preamble needs to wait for the whole packet to be decoded. The maximum PLC packet can be over 300 ms, and, thus, the PLC channel capacity can be wasted. Accordingly, time sensitive PCU power control messages cannot be sent out immediately by a gateway. Second, the unwanted PLC messages from other domains can cause the gateway to process the packets and waste the computer resources.

Accordingly, there is a need for improved energy management systems that use power line communication (PLC) for domain and cross talk separations via unique preambles.

SUMMARY

In accordance with some aspects of the disclosure, an energy management system comprises a gateway and distributed energy resources coupled to a corresponding plurality of power conditioners and a distributed energy resource controller in operative communication with the plurality of power conditioners via power line communication. The distributed energy resource controller is configured to generate a unique preamble for each power conditioner of the plurality of power conditioners and transmit the unique preamble to each power conditioner of the plurality of power conditioners to communicate with each power conditioner of the plurality of power conditioners via power line communication.

In accordance with some aspects of the disclosure, a method for preamble generations comprises a) setting a seed and initial memory values, b) generating a predetermined bit (e.g., 64 bit) candidate preamble and $NPP_x$, c) calculating a cross-correlation to a default preamble, d) determining if a maximum absolute cross-correlation value (Max(abs) cross))) is less than a predetermined value, e) if yes at d), f) choosing a candidate preamble and finishing the candidate preamble and $NPP_x$ search, g) if no at d), h) determining if a predetermined number of trials have been finished, i) if no at g), j) reperforming c), j) if yes at g), k) finding a min-max cross-correlation for the candidate preamble and $NPP_x$, and l) choosing the candidate preamble and finishing the candidate preamble and $NPP_x$ search.

In accordance with some aspects of the disclosure, a method for assigning unique preambles comprises a) performing an initial installation of an energy management system, b) assigning a default preamble to both a plurality of PCUs and a gateway for initial discovery, c) determining if all of the plurality of PCUs are discovered, d) if no at c), e) reperforming b), f) if yes at c), g) broadcasting a message to the plurality of PCUs to provide a new preamble and requiring acknowledgement from the plurality of PCUs, h) determining if all acknowledgements have been received from the plurality of PCUs, i) if no at h), j) reperforming g), k) if yes at h), l) broadcasting a message to ask the plurality of PCUs to change to the preamble, and m) communicating between the gateway and the plurality of PCUs using the new preamble.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Embodiments of the present disclosure relate to energy management systems that use power line communication (PLC) for domain and cross talk separations via unique preambles. For example, an energy management system comprises a gateway and distributed energy resources coupled to a corresponding plurality of power conditioners and a distributed energy resource controller in operative communication with the plurality of power conditioners via power line communication. The distributed energy resource controller is configured to generate a unique preamble for each power conditioner of the plurality of power conditioners and transmit the unique preamble to each power conditioner of the plurality of power conditioners to communicate with each power conditioner of the plurality of power conditioners via power line communication. Cross domain communication can waste the PLC transmission bandwidth, which, in turn, can prevent critical power control messages to be delivered to the microinverters. With the methods and apparatus described herein, however, cross-domain issues over challenges in microinverter deployments are reduced, if not eliminated.

Figure 1:
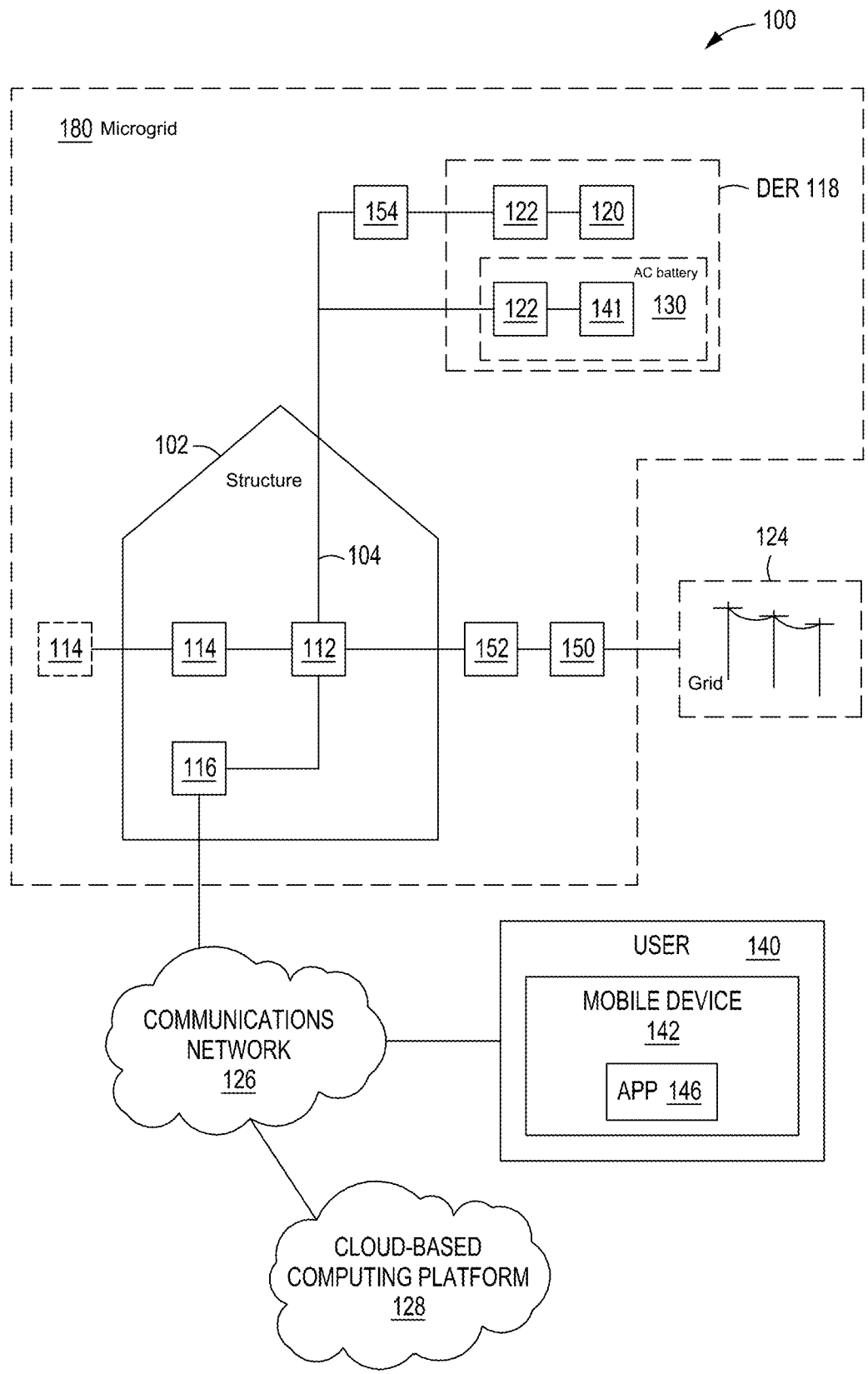
FIG. 1 is a block diagram of an energy management system, in accordance with one or more embodiments of the present disclosure.

FIG. 1 is a block diagram of a system 100 (e.g., an energy management system or power conversion system) in accordance with one or more embodiments of the present disclosure. The diagram of FIG. 1 only portrays one variation of the myriad of possible system configurations. The present disclosure can function in a variety of environments and systems.

The system 100 comprises a structure 102 (e.g., a user's structure), such as a residential home or commercial building, having an associated DER 118 (distributed energy resource). The DER 118 is situated external to the structure 102. For example, the DER 118 may be located on the roof of the structure 102 or can be part of a solar farm. The structure 102 comprises one or more loads (e.g., appliances, electric hot water heaters, thermostats/detectors, boilers, water pumps, and the like), one or more energy storage devices (an energy storage system 114), which can be located within or outside the structure 102, and a DER controller 116, each coupled to a load center 112. Although the energy storage system 114, the DER controller 116, and the load center 112 are depicted as being located within the structure 102, one or more of these may be located external to the structure 102. In at least some embodiments, the energy storage system 114 can be, for example, one or more of the energy storage devices (e.g., IQ Battery 10®) commercially available from Enphase® Inc. of Petaluma, CA. Other energy storage devices from Enphase® Inc. or other manufacturers may also benefit from the inventive methods and apparatus disclosed herein.

The load center 112 is coupled to the DER 118 by an AC bus 104 and is further coupled, via a meter 152 and a MID 150 (e.g., microgrid interconnect device), to a grid 124 (e.g., a commercial/utility power grid). The structure 102, the energy storage system 114, DER controller 116, DER 118, load center 112, generation meter 154, meter 152, and MID 150 are part of a microgrid 180. It should be noted that one or more additional devices not shown in FIG. 1 may be part of the microgrid 180. For example, a power meter or similar device may be coupled to the load center 112.

The DER 118 comprises at least one renewable energy source (RES) coupled to power conditioners 122. For example, the DER 118 may comprise a plurality of RESs 120 coupled to a plurality of power conditioners 122 in a one-to-one correspondence (or two-to-one). In embodiments described herein, each RES of the plurality of RESs 120 is a photovoltaic module (PV module), although in other embodiments the plurality of RESs 120 may be any type of system for generating DC power from a renewable form of energy, such as wind, hydro, and the like. The DER 118 may further comprise one or more batteries (or other types of energy storage/delivery devices) coupled to the power conditioners 122 in a one-to-one correspondence, where each pair of power conditioner 122 and a battery 141 may be referred to as an AC battery 130.

The power conditioners 122 invert the generated DC power from the plurality of RESs 120 and/or the battery 141 to AC power that is grid-compliant and couple the generated AC power to the grid 124 via the load center 112. The generated AC power may be additionally or alternatively coupled via the load center 112 to the one or more loads and/or the energy storage system 114. In addition, the power conditioners 122 that are coupled to the batteries 141 convert AC power from the AC bus 104 to DC power for charging the batteries 141. A generation meter 154 is coupled at the output of the power conditioners 122 that are coupled to the plurality of RESs 120 in order to measure generated power.

In some alternative embodiments, the power conditioners 122 may be AC-AC converters that receive AC input and convert one type of AC power to another type of AC power. In other alternative embodiments, the power conditioners 122 may be DC-DC converters that convert one type of DC power to another type of DC power. In some of embodiments, the DC-DC converters may be coupled to a main DC-AC inverter for inverting the generated DC output to an AC output.

The power conditioners 122 may communicate with one another and with the DER controller 116 using power line communication (PLC), although additionally and/or alternatively other types of wired and/or wireless communication may be used. The DER controller 116 may provide operative control of the DER 118 and/or receive data or information from the DER 118. For example, the DER controller 116 may be a gateway that receives data (e.g., alarms, messages, operating data, performance data, and the like) from the power conditioners 122 and communicates the data and/or other information via the communications network 126 to a cloud-based computing platform 128, which can be configured to execute one or more application software, e.g., a grid connectivity control application, to a remote device or system such as a master controller (not shown), and the like. The DER controller 116 may also send control signals to the power conditioners 122, such as control signals generated by the DER controller 116 or received from a remote device or the cloud-based computing platform 128. The DER controller 116 may be communicably coupled to the communications network 126 via wired and/or wireless techniques. For example, the DER controller 116 may be wirelessly coupled to the communications network 126 via a commercially available router. In one or more embodiments, the DER controller 116 comprises an application-specific integrated circuit (ASIC) or microprocessor along with suitable software (e.g., a grid connectivity control application) for performing one or more of the functions described herein. For example, the DER controller 116 can include a memory (e.g., a non-transitory computer readable storage medium) having stored thereon instructions that when executed by a processor perform methods for preamble generations and methods for assigning unique preambles, as described in greater detail below.

The generation meter 154 (which may also be referred to as a production meter) may be any suitable energy meter that measures the energy generated by the DER 118 (e.g., by the power conditioners 122 coupled to the plurality of RESs 120). The generation meter 154 measures real power flow (kWh) and, in some embodiments, reactive power flow (KVAR). The generation meter 154 may communicate the measured values to the DER controller 116, for example using PLC, other types of wired communications, or wireless communication. Additionally, battery charge/discharge values are received through other networking protocols from the AC battery 130 itself.

The meter 152 may be any suitable energy meter that measures the energy consumed by the microgrid 180, such as a net-metering meter, a bi-directional meter that measures energy imported from the grid 124 and well as energy exported to the grid 124, a dual meter comprising two separate meters for measuring energy ingress and egress, and the like. In some embodiments, the meter 152 comprises the MID 150 or a portion thereof. The meter 152 measures one or more of real power flow (kWh), reactive power flow (KVAR), grid frequency, and grid voltage.

The MID 150, which may also be referred to as an island interconnect device (IID), connects/disconnects the microgrid 180 to/from the grid 124. The MID 150 comprises a disconnect component (e.g., a contactor or the like) for physically connecting/disconnecting the microgrid 180 to/from the grid 124. For example, the DER controller 116 receives information regarding the present state of the system from the power conditioners 122, and also receives the energy consumption values of the microgrid 180 from the meter 152 (for example via one or more of PLC, other types of wired communication, and wireless communication), and based on the received information (inputs), the DER controller 116 determines when to go on-grid or off-grid and instructs the MID 150 accordingly. In some alternative embodiments, the MID 150 comprises an ASIC or CPU, along with suitable software (e.g., an islanding module) for determining when to disconnect from/connect to the grid 124. For example, the MID 150 may monitor the grid 124 and detect a grid fluctuation, disturbance or outage and, as a result, disconnect the microgrid 180 from the grid 124. Once disconnected from the grid 124, the microgrid 180 can continue to generate power as an intentional island without imposing safety risks, for example on any line workers that may be working on the grid 124.

In some alternative embodiments, the MID 150 or a portion of the MID 150 is part of the DER controller 116. For example, the DER controller 116 may comprise a CPU and an islanding module for monitoring the grid 124, detecting grid failures and disturbances, determining when to disconnect from/connect to the grid 124, and driving a disconnect component accordingly, where the disconnect component may be part of the DER controller 116 or, alternatively, separate from the DER controller 116. In some embodiments, the MID 150 may communicate with the DER controller 116 (e.g., using wired techniques such as power line communications, or using wireless communication) for coordinating connection/disconnection to the grid 124.

A user 140 can use one or more computing devices, such as a mobile device 142 (e.g., a smart phone, tablet, or the like) communicably coupled by wireless means to the communications network 126. The mobile device 142 has a CPU, support circuits, and memory, and has one or more applications 146 (e.g., a grid connectivity control application) installed thereon for controlling the connectivity with the grid 124 as described herein. The one or more applications 146 may run on commercially available operating systems, such as IOS, ANDROID, and the like.

In order to control connectivity with the grid 124, the user 140 interacts with an icon displayed on the mobile device 142, for example a grid on-off toggle control or slide, which is referred to herein as a toggle button. The toggle button may be presented on one or more status screens pertaining to the microgrid 180, such as a live status screen (not shown), for various validations, checks and alerts. The first time the user 140 interacts with the toggle button, the user 140 is taken to a consent page, such as a grid connectivity consent page, under setting and will be allowed to interact with toggle button only after he/she gives consent.

Once consent is received, the scenarios below, listed in order of priority, will be handled differently. Based on the desired action as entered by the user 140, the corresponding instructions are communicated to the DER controller 116 via the communications network 126 using any suitable protocol, such as HTTP(S), MQTT(S), Web Sockets, and the like. The DER controller 116, which may store the received instructions as needed, instructs the MID 150 to connect to or disconnect from the grid 124 as appropriate.

Figure 2:
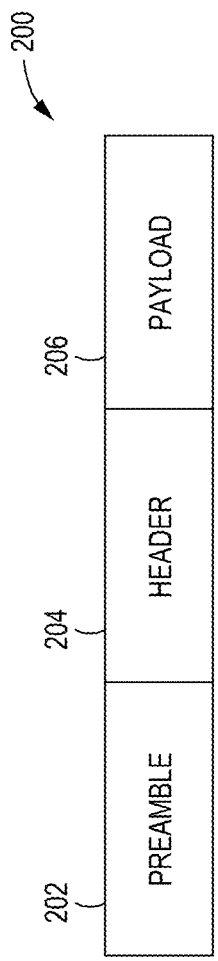
FIG. 2 is a diagram of a PLC packet structure, in accordance with one or more embodiments of the present disclosure.

FIG. 2 is a diagram of a PLC packet structure 200, in accordance with one or more embodiments of the present disclosure. For example, the PLC packet structure 200 comprises a preamble 202, a header, 204, and a payload 206. The inventors have found that if each domain is associated with a unique preamble, except for the intended domain to receive a message, the other domains will disregard the PLC signal since the different preambles are designed to be pseudo-orthogonal to each other.

Figure 3:
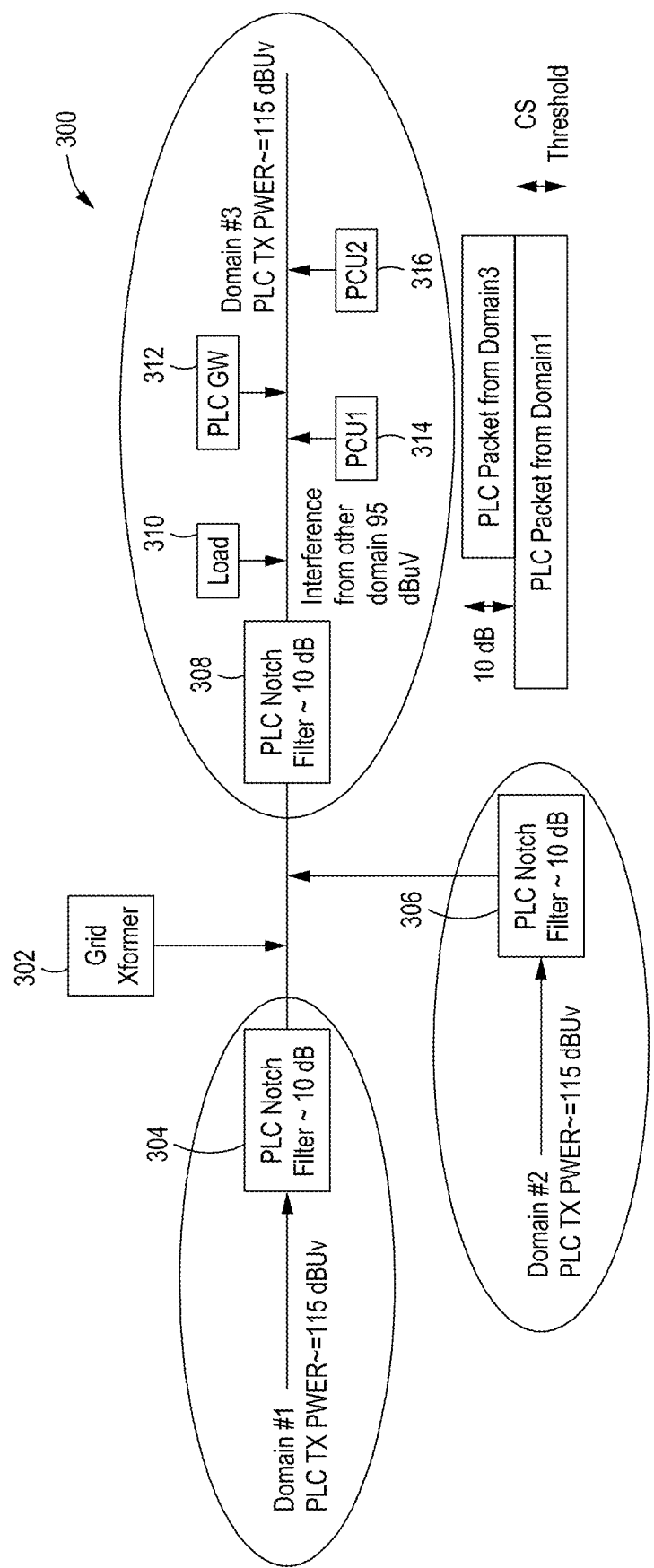
FIG. 3 is a diagram of a hybrid solution to solve a cross-domain communication, in accordance with one or more embodiments of the present disclosure.

FIG. 3 is a diagram of the hybrid solution 300 to solve a cross-domain communication, in accordance with one or more embodiments of the present disclosure. For example, FIG. 3 shows an embodiment that uses a notch filter and a unique preamble to prevent cross-domain communications. For example, three domains D1, D2, and D3 are behind a power grid transformer 302. Each domain uses a notch filter 304, 306, 308, which in some embodiments can be configured to provide a certain number of dB attenuations (e.g., at least over 1 dB attenuations to distinguish an interested domain with one or more interference domains. For example, the number of dB attenuations can be related to a PLC environment. In some instances, a domain may receive several PLC signals from other domains. For example, in at least some embodiments, when a background noise is relatively small, 1-2 dB attenuations can be used for the unique preamble PLC communications. As an example, if domain D1 transmits a PLC signal at 115 dBuV, that PLC signal can arrive at domain D3 at 95 dBuV. For illustrative purposes, domain D3 is shown in detail and comprises the notch filter 308, a load 310 (e.g., loads from the structure 102, such as appliances, electric hot water heaters, thermostats/detectors, boilers, water pumps, and the like), and PLC gateway 312 and a PCU 314, and a PCU 316. For domain D3, PLC signals from domain D1 and domain D2 can be considered interferences. Empirical testing (e.g., computer simulations and lab tests) proved that if the signal-to-interference ratio is above a certain number, the PLC in domain D3 is not affected by the interferences from the other domains. For example, the signal-to-interference ratio requirement can be related to the PLC channel background noise. Thus, in at least some embodiments, such as when the noise is relatively strong, the signal-to-interference ratio can be about 15 dBs, and when the noise is relatively weak, the signal-to-interference ratio can be about 2 dBs.

Since a preamble is used to distinguish a domain from the other domains, which requires the cross correlations (e.g., a measurement that tracks the movements of two or more sets of time-series data relative to one another to compare multiple time series and objectively determine how well the two or more sets of time-series data match up with each other) among the different preambles, and no payload packet (NPP), the preamble looks like white noise. Thus, the preambles in different domains should be pseudo-orthogonal. Due to the pseudo-orthogonal property of the preamble, the PLC signals can be filtered out by one or more preamble detectors and the messages are never sent back to an upper layer.

Figure 4:
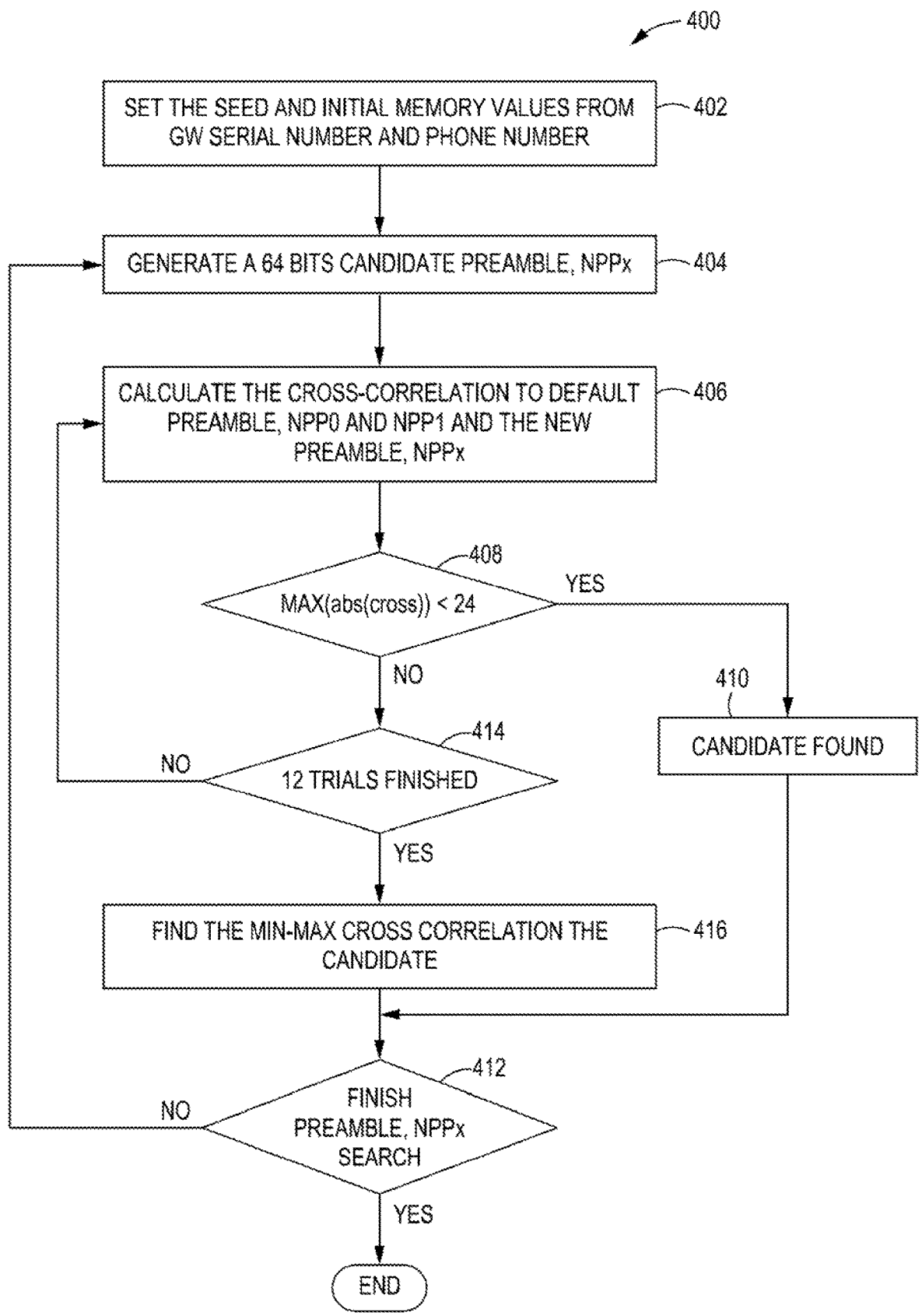
FIG. 4 is a flowchart of a method for preamble generations, in accordance with one or more embodiments of the present disclosure.

Accordingly, in at least some embodiments, the inventors have found that a random generator process can be used to obtain the packet and NPP preambles. For example, FIG. 4 is a flowchart of a method 400 for preamble generations, in accordance with one or more embodiments of the present disclosure. Alternatively, in at least some embodiments, a linear feedback shift register process can be used to obtain the packet and NPP preambles.

For example, at 402, the method 400 comprises setting a seed and initial memory values from a gateway serial number and/or phone number. For example, in at least some embodiments, the seed and the initial memory values can be set at the DER controller 116 (which can be a gateway controller). For example, in at least some embodiments, the DER controller 116 serial number or a user home phone number can be used as a seed and the user home address can be used as the initial memory value.

Next, at 404, the method 400 comprises generating a bit candidate preamble and $NPP_x$. For example, the DER controller 116 can generate one or more bit (e.g., 64 bit, 108 bit, and 153 bit) candidate preambles and $NPP_x$. For example, in at least some embodiments, the DER controller 116 can generate a 64 bit candidate preamble and $NPP_x$.

Next, at 406, the method 400 comprises calculating a cross-correlation to a default preamble (e.g., $NPP_0$, $NPP_1$, . . . ) and a new candidate preamble (e.g., $NPP_x$). For example, the DER controller 116 calculates the cross-correlation to a default preamble (e.g., $NPP_0$, $NPP_1$, . . . ) and a new candidate preamble (e.g., $NPP_x$).

Next, at 408, the method 400 comprises determining if a maximum absolute cross-correlation value Max(abs(cross)) is less than a predetermined value. For example, the maximum absolute cross-correlation value Max(abs(cross)), where cross is a cross correlation, can be derived from new time sequence with the reference of the default sequence, which then gets the maximum absolute value of cross. In at least some embodiments, the predetermined value can be 24. For example, in at least some embodiments, 24 can be selected to make a miss-detection probability less than 0.1%. If yes at 408, the candidate preamble and $NPP_x$ is chosen at 410. Next, at 412, the method 400 comprises finishing the candidate preamble and $NPP_x$ search.

If no 408, at 414, the method 400 comprises determining if a predetermined number of trials have been finished. For example, in at least some embodiments, the number of trials can be selected based on one or more factors. For example, a first factor, can be based on a computer simulation. For example, based on a computer simulation, the inventors have found that a probability of minimum cross-correlation after 12 trails above the pseudo-orthogonal threshold, e.g., 24, is less than 0.03%. Accordingly, in at least some embodiments, the predetermined number of trials is 12. A second factor can be based on time constraints (e.g., based on a search time for the candidate preamble and $NPP_x$—how quickly the candidate preamble and $NPP_x$ search is completed. If no at 414, the method 400 loops back to 406 and 408. Alternatively, if yes at 414, at 416, the method 400 comprises finding a min-max cross-correlation for the candidate preamble and $NPP_x$. Next, after the min-max cross-correlation for the candidate preamble and $NPP_x$ is found, the method 400 comprises finishing the preamble and $NPP_x$ search at 412.

Figure 5:
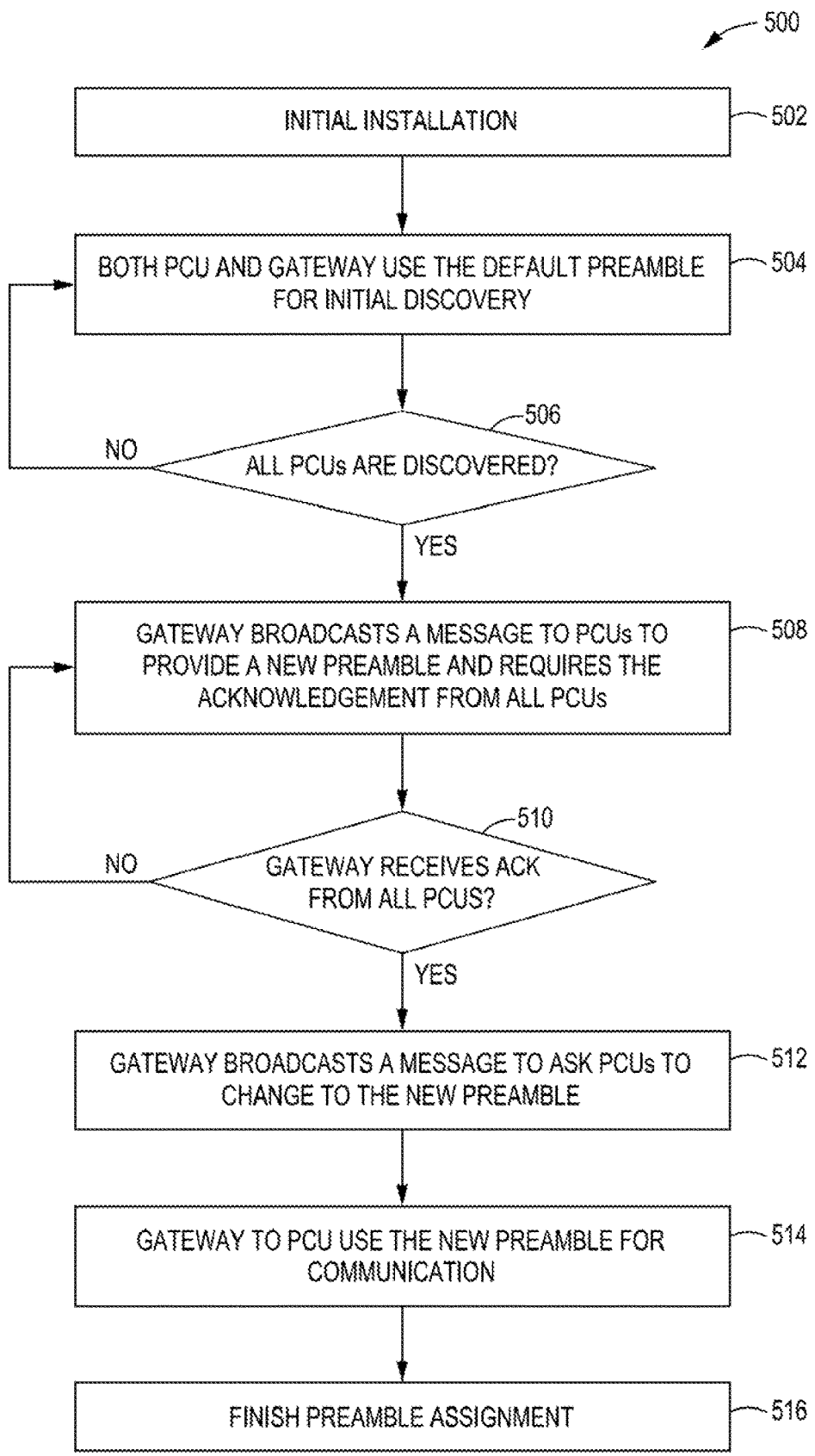
FIG. 5 is a flowchart of a method for assigning unique preambles, in accordance with one or more embodiments of the present disclosure.
Figure 6:
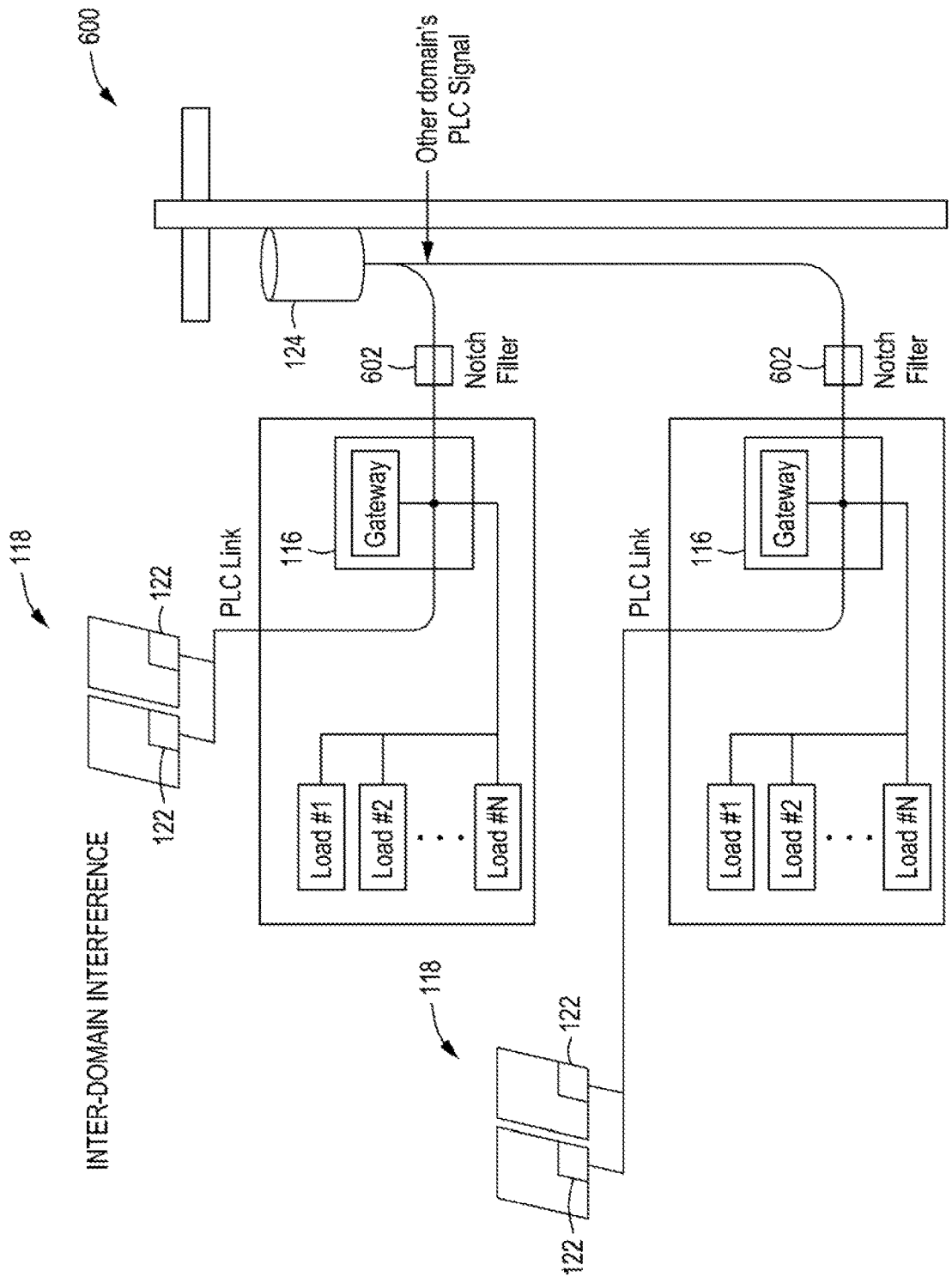
FIG. 6 is a diagram of a PLC domain, in accordance with one or more embodiments of the present disclosure.

After 412, the DER controller 116 can transmit/assign the unique preambles to one or more PCUs. For example, FIG. 5 is a flowchart of a method 500 for assigning unique preambles, and FIG. 6 is a diagram of a PLC domain 600, in accordance with one or more embodiments of the present disclosure.

For example, at 502, the method 500 comprises performing an initial installation of an energy management system (e.g., the system 100). Next, at 504, the method 500 comprises assigning a default preamble to both a PCU and a gateway for initial discovery (e.g., used for initial discovery of all the plurality of PCUs in a domain of the gateway). For example, the PCU (e.g., the power conditioners 122 of the DER 118) and the DER controller 116 can be assigned with a default preamble for initial discovery. For example, the DER controller 116 uses the default preamble to commission and discover all PCUs in the DER controller 116 domain.

Next, at 506, the method 500 comprises determining if all PCUs are discovered. If no at 506, the method loops back to 504. If yes at 506, at 508, the method 500 comprises broadcasting a message to the PCUs to provide a new preamble (e.g., generated using the method 400) and requiring acknowledgement from the PCUs. For example, when all PCUs are discovered, the DER controller 116 broadcasts a message to the power conditioners 122 to include the unique preamble and $NPP_x$s and requires acknowledgement the power conditioners 122.

Next, at 510, the method 500 comprises determining if all acknowledgements have been received from the PCUs. For example, the DER controller 116 determines if all acknowledgements have been received from the power conditioners 122. If no at 510, the method 500 loops back to 508. If yes at 510, next, at 512, the method 500 comprises broadcasting a message to ask the PCUs to change to the preamble. For example, once all acknowledgements are received from all the power conditioners, the DER controller 116 broadcasts another message to inform the power conditioners to change the preamble and NPPs to the new assigned preamble and $NPP_x$s.

Next, at 514, the method 500 comprises communicating between the gateway and the PCUs using the new preamble. For example, the DER controller 116 and the power conditioners 122 use the new unique preamble to communicate with each other, which finishes the procedure of the unique preamble and $NPP_x$s assignments at 516.

As noted above, cross domain communication as interference can waste the PLC transmission bandwidth, which, in turn, can prevent critical power control messages to be delivered to the microinverters. With the methods and apparatus described herein, however, cross-domain interferences over PLC in microinverter deployments (e.g., the power conditioners 122) are reduced, if not eliminated.

Moreover, conventional energy management systems or power conversion systems use a universal preamble, and one or more conventional line filters (e.g., which provide 60 dB attenuation) to block the PLC among domains. For example, the DER controller 116 and the power conditioners can be positioned behind a line filter 602 to block the PLC signals from other domains, but such filters are expensive, require additional installation time, and are not capable of eliminating cross-talk when the PLC wires are close to each other (FIG. 6). Since the methods and apparatus described herein use a unique preamble for each PCU, a relatively inexpensive notch filter (e.g., which provides about 10 dB of attenuation) can be used and the need for the conventional line filters is eliminated.

While the foregoing is directed to embodiments of the present disclosure, other and further embodiments of the disclosure may be devised without departing from the basic scope thereof, and the scope thereof is determined by the claims that follow.

What is claimed is:

1. A method for assigning unique preambles, comprising:
   a) performing an initial installation of an energy management system;
   b) assigning a default preamble to both a plurality of power control units (PCUs) and a gateway;
   c) determining if all of the plurality of PCUs are discovered;
   d) if no at c), e) reperforming b);
   f) if yes at c), g) broadcasting a message to the plurality of PCUs to provide a new preamble and requiring acknowledgement from the plurality of PCUs;
   h) determining if all acknowledgements have been received from the plurality of PCUs;
   i) if no at h), j) reperforming g);
   k) if yes at h), l) broadcasting a message to ask the plurality of PCUs to change to the new preamble; and
   m) communicating between the gateway and the plurality of PCUs using the new preamble.

2. The method of claim 1, wherein the assigning the default preamble to both the plurality of PCUs and the gateway is used for initial discovery of all the plurality of PCUs in a domain of the gateway.

3. The method of claim 1, wherein to provide the new preamble comprises at least one of:
   a) setting a seed and initial memory values;
   b) generating a predetermined number of bit candidate preambles and a no payload packet ($NPP_x$);
   c) calculating a cross-correlation to the default preamble;
   d) determining if a maximum absolute cross-correlation value (Max(abs)cross) is less than a predetermined value;
   e) if yes at d), f) choosing a candidate preamble and finishing the candidate preamble and $NPP_x$ search;
   g) if no at d), h) determining if a predetermined number of trials have been finished;
   i) if no at g), j) reperforming c);
   j) if yes at g), k) finding a min-max cross-correlation for the candidate preamble and $NPP_x$; and
   l) choosing the candidate preamble and finishing the candidate preamble and $NPP_x$ search.

4. The method of claim 3, wherein the seed is set based on at least one of gateway serial number or phone number and the initial memory values is set based on a user home address.

5. The method of claim 3, wherein the predetermined number of bit candidate preambles and no payload packet ($NPP_x$) is one of 64 bit, 108 bit, and 153 bit.

6. The method of claim 5, wherein the predetermined number of bit candidate preambles and no payload packet ($NPP_x$) is 64 bit.

7. The method of claim 3, wherein the predetermined value is 24.

8. The method of claim 3, wherein the predetermined value is 24 to make a miss-detection probability less than 0.1%.

9. The method of claim 3, wherein the predetermined number of trials is 12.

10. The method of claim 3, wherein the predetermined number of trials is based on at least one of a computer simulation or a time constraint.

11. The method of claim 10, wherein the computer simulation determines when a probability of minimum cross-correlation is less than about 0.03%.

12. The method of claim 10, wherein the time constraint is based on a search time for the candidate preamble and $NPP_x$.

* * * * *